(12) United States Patent
Kim (10) Patent No.: US 10,336,308 B2
(45) Date of Patent: Jul. 2, 2019

(54) BRAKE DEVICE FOR VEHICLE

(71) Applicant: HYUNDAI MOBIS CO., LTD., Seoul (KR)

(72) Inventor: Jong Sung Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 2 days.

(21) Appl. No.: 15/690,608

(22) Filed: Aug. 30, 2017

(65) Prior Publication Data

US 2018/0056968 A1    Mar. 1, 2018

(30) Foreign Application Priority Data

Aug. 31, 2016  (KR) .................. 10-2016-0111646

(51) Int. Cl.

| | |
|---|---|
| *B60T 11/16* | (2006.01) |
| *B60T 17/08* | (2006.01) |
| *B60T 7/04* | (2006.01) |
| *B60T 13/16* | (2006.01) |
| *B60T 13/68* | (2006.01) |
| *B60T 17/02* | (2006.01) |
| *B60T 8/40* | (2006.01) |
| *B60T 11/18* | (2006.01) |

(52) U.S. Cl.
CPC ............... *B60T 17/08* (2013.01); *B60T 7/04* (2013.01); *B60T 7/042* (2013.01); *B60T 8/4081* (2013.01); *B60T 8/4086* (2013.01); *B60T 11/18* (2013.01); *B60T 13/165* (2013.01); *B60T 13/166* (2013.01); *B60T 13/686* (2013.01); *B60T 17/02* (2013.01); *B60T 8/4072* (2013.01); *B60T 2270/82* (2013.01); *B60Y 2304/05* (2013.01)

(58) Field of Classification Search
CPC ...... B60T 11/224; B60T 11/165; B60T 11/18; B60T 13/745; B60T 11/20; B60T 13/573
USPC ................... 60/552, 553, 588, 591
See application file for complete search history.

(56) References Cited

U.S. PATENT DOCUMENTS

| | | | | |
|---|---|---|---|---|
| 2,175,447 | A | * | 10/1939 | Rike ...................... B60T 11/22 188/152 |
| 2,396,155 | A | * | 3/1946 | Christensen .......... B60T 11/165 60/588 |
| 2,561,009 | A | * | 7/1951 | Byers ..................... B60T 11/165 60/588 |

(Continued)

FOREIGN PATENT DOCUMENTS

KR    10-1622148 B1    6/2016

*Primary Examiner* — Bradley T King
*Assistant Examiner* — Stephen M Bowes
(74) *Attorney, Agent, or Firm* — Knobbe Martens Olson & Bear LLP (57) ABSTRACT

A brake device may include: a master cylinder including a master piston moved in connection with a pedal, and a master cylinder body having the master piston movably inserted therein and containing fluid of which hydraulic pressure is varied when the master piston is moved; a pedal force generation part housed in the master cylinder body, and restricting a motion of the master piston while interfering with the master piston depending on the motion of the master piston; a braking actuator configured to generate hydraulic pressure; an actuator connection part connecting the braking actuator to a brake mounted on a wheel; and a master connection part connecting the master cylinder to the actuator connection part.

5 Claims, 8 Drawing Sheets

(56) References Cited

U.S. PATENT DOCUMENTS

| | | | | |
|---|---|---|---|---|
| 2,577,153 | A * | 12/1951 | James | B60T 11/165 |
| | | | | 277/577 |
| 4,945,728 | A * | 8/1990 | Coleman | B60T 11/20 |
| | | | | 277/572 |
| 5,609,399 | A * | 3/1997 | Feigel | B60T 8/3265 |
| | | | | 188/162 |
| 6,336,329 | B1 * | 1/2002 | Adler | B60T 11/16 |
| | | | | 60/588 |
| 2003/0213240 | A1 * | 11/2003 | Nix | B60T 11/16 |
| | | | | 60/588 |
| 2008/0143054 | A1 * | 6/2008 | Zehnder | B60T 11/20 |
| | | | | 277/436 |
| 2013/0147259 | A1 * | 6/2013 | Linkenbach | B60T 7/042 |
| | | | | 303/14 |

* cited by examiner

BRAKE DEVICE FOR VEHICLE

CROSS-REFERENCES TO RELATED APPLICATIONS

The present application claims priority to Korean application number 10-2016-0111646, filed on Aug. 31, 2016, which is incorporated by reference in its entirety.

BACKGROUND OF THE INVENTION

The present invention relates to a brake device, and more particularly, to a hydraulic brake device capable of implementing a braking force of a vehicle.

A brake device refers to a safety device used for decelerating or stopping a vehicle or maintaining a parking state. Recently, an electromechanical brake (EMB) has been developed to replace existing mechanical brakes.

However, the EMB which does not use brake fluid cannot mechanically perform emergency braking, and requires strict reliability verification. Thus, a hydraulic brake-by-wire system such as an e-booster with a hydraulic brake system is applied.

Since the conventional hydraulic brake-by-wire system separately includes a master cylinder and a pedal simulator for implementing a pedal force, the volume of the device and the number of parts used in the system are inevitably increased to raise the cost thereof. Furthermore, since a plurality of valves is applied, operation noise is increased. In addition, the configuration and control of the system are complex, and power is consumed to operate the valves. Therefore, there is a demand for a structure capable of solving the problems.

The related art is disclosed in Korean Patent Registration No. 10-1622148 registered on May 12, 2016 and entitled "Electronic brake system".

SUMMARY OF THE INVENTION

Embodiments of the present invention are directed to a brake device capable of reducing the volume thereof, the number of parts used therein and the cost thereof, through a simple structure.

In one embodiment, a brake device may include: a master cylinder including a master piston moved in connection with a pedal, and a master cylinder body having the master piston movably inserted therein and containing fluid of which hydraulic pressure is varied when the master piston is moved; a pedal force generation part housed in the master cylinder body, and restricting a motion of the master piston while interfering with the master piston depending on the motion of the master piston; a braking actuator configured to generate hydraulic pressure; an actuator connection part connecting the braking actuator to a brake mounted on a wheel; and a master connection part connecting the master cylinder to the actuator connection part.

The master cylinder may include a master elastic part inserted into the master cylinder body and elastically supporting the master piston.

One end of the master elastic part may be in contact with the master cylinder body, and the other end of the master elastic part may be in contact with the master piston.

The master cylinder body may have an opened end, include a cylinder space into which the master piston is movably inserted, and receive fluid from a reservoir containing fluid therein, and the hydraulic pressure of the fluid contained in the master cylinder body may be varied depending on the extent that the fluid is pressurized by the master piston, and transferred to a brake through the master connection part and the actuator connection part.

The master piston may include: a pedal connection part moved in connection with the pedal; and a master piston body coupled to the pedal connection part, movably inserted into the master cylinder body, and having the master elastic part inserted therein.

The pedal force generation part may include: a pedal force generation fixed part fixed to the master cylinder body; and a pedal force generation body protruding from the pedal force generation fixed part, and elastically deformed while interfering with the master piston depending on the motion of the master piston.

The pedal force generation part may be formed in a ring shape through which the master piston enters and exits.

The pedal force generation body may include a first inclined part inclined toward a central axis of the master cylinder body along a direction in which the master piston enters the master cylinder body, and interfering with the master piston depending on the motion of the master piston.

The pedal force generation body may further include a second inclined part connected to the first inclined part, and inclined in a direction away from the central axis of the master cylinder body along the direction in which the master piston enters the master cylinder body.

When the master piston passes through the first inclined part, the second inclined part may release the pedal force applied to the master piston, and increase the hydraulic pressure of the master cylinder body through the motion of the master piston during an emergency.

The pedal force generation fixed part and the pedal force generation body may be formed as one body.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
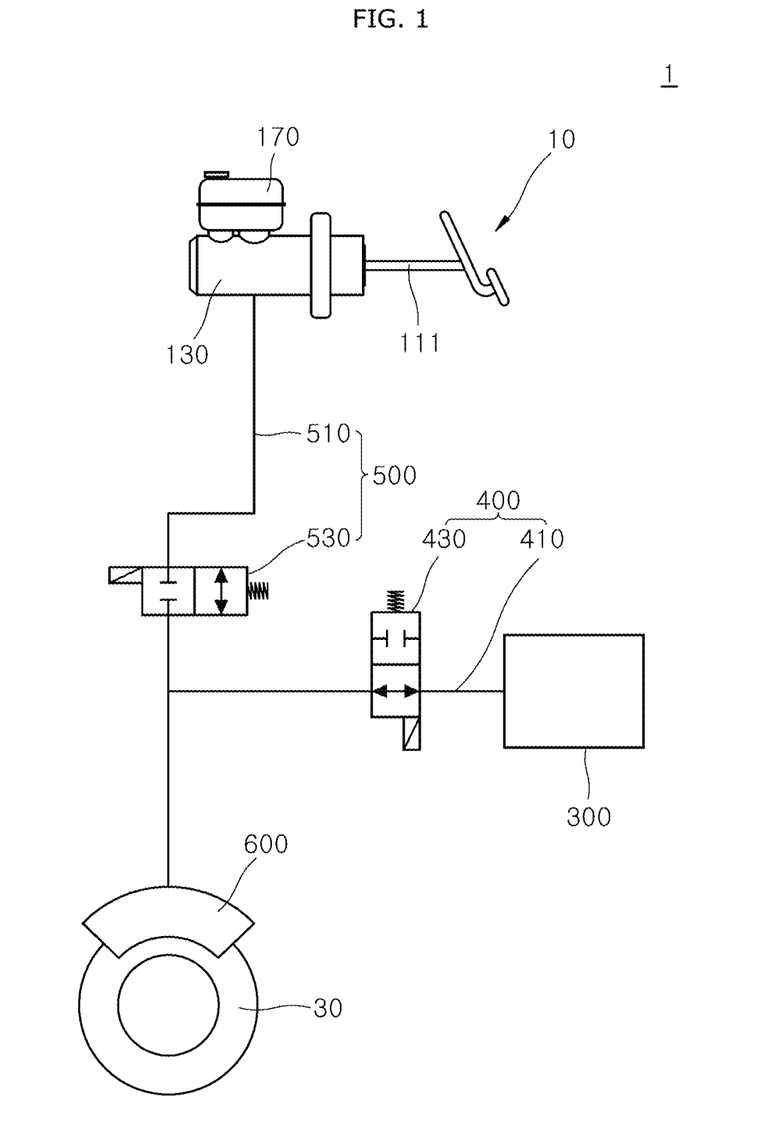
FIG. 1 is a schematic conceptual view illustrating a brake device in accordance with an embodiment of the present invention.
Figure 2:
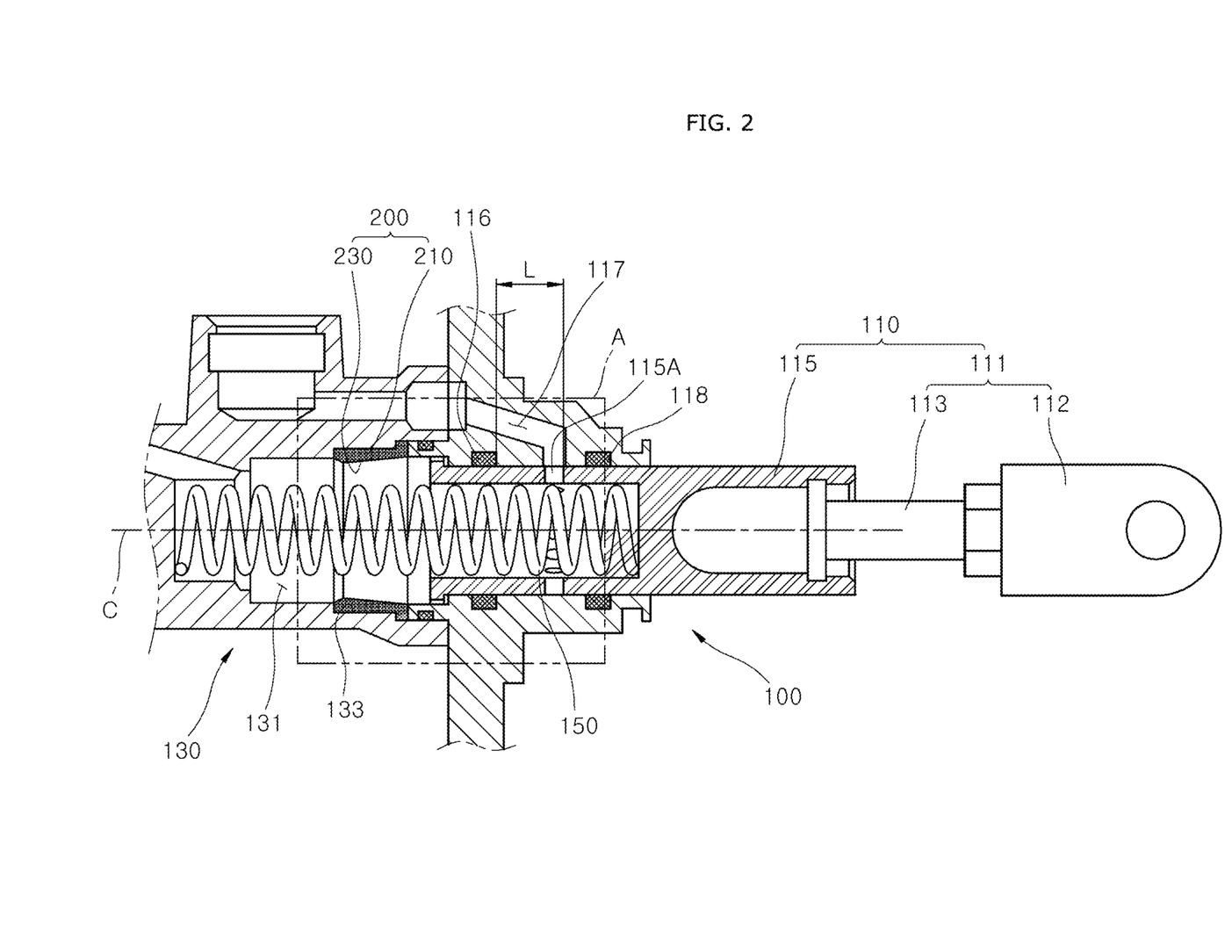
FIG. 2 is a schematic cross-sectional view of a master cylinder and a pedal force generation part in accordance with the embodiment of the present invention.
Figure 3:
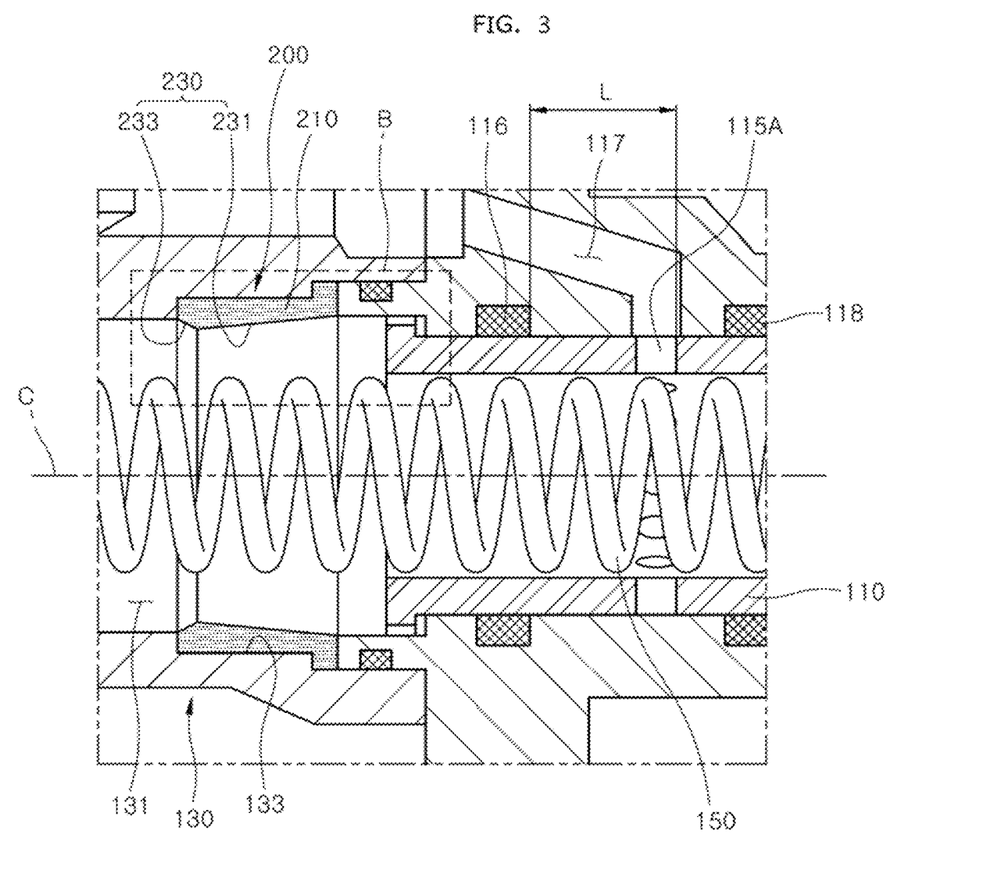
FIG. 3 illustrates a portion A of FIG. 2.

FIG. 1 is a schematic conceptual view illustrating a brake device in accordance with an embodiment of the present invention, FIG. 2 is a schematic cross-sectional view of a master cylinder and a pedal force generation part in accordance with the embodiment of the present invention, and FIG. 3 illustrates a portion A of FIG. 2.

Referring to FIGS. 1 to 3, the brake device 1 in accordance with the present embodiment may include a master cylinder 100, a pedal force generation part 200, a braking actuator 300, an actuator connection part 400 and a master connection part 500.

The master cylinder 100 may be moved in connection with a pedal 10. That is, when a driver steps on a pedal 10, pressure applied to fluid contained in the master cylinder 100 may be increased to generate hydraulic pressure. In the present embodiment, the master cylinder 100 may include a master piston 110 and a master cylinder body 130.

The master piston 110 may be connected to the pedal 10. When the driver steps on the pedal 10, the master piston 110 inserted into the master cylinder body 130 may be moved in the master cylinder body 130. In the present embodiment, the master piston 110 may include a pedal connection part 111 and a master piston body 115.

The pedal connection part 111 to which the pedal 10 is rotatably connected may be moved in connection with the pedal 10. In the present embodiment, the pedal connection part 111 may include a clevis 112 and an operating rod 113.

The clevis 112, to which a pedal support part 11 of the pedal 10 is rotatably coupled through a pin coupling, may transfer a force to the operating rod 113, the force being applied to the pedal 10 by the driver.

The operating rod 113 may connect the clevis 112 and the master piston body 115 such that the master piston body 115 can be moved in connection with the movement of the pedal 10. In the present embodiment, the operating rod 113 may be coupled to the clevis 112 and the master piston body 115 through insertion and bolting, and reciprocated with the master piston body 115.

The master piston body 115 may be connected to the pedal connection part 111, specifically, the operating rod 113 through insertion or the like, inserted into the master cylinder body 130 so as to reciprocate therein, and have a master elastic part 150 inserted therein.

The master cylinder body 130 may be coupled to a vehicle body, and contain fluid therein, and the master piston 110 may movably inserted into the master cylinder body 130. The master piston 110 may be moved to vary the pressure of the fluid contained in the master cylinder body 130.

In the present embodiment, one end portion of the master cylinder body 130 (right end portion in FIG. 2) may be opened, and a cylinder space 131 may be formed in the master cylinder body 130 such that the master piston 110 is movably inserted into the master cylinder body 130. Furthermore, the master cylinder body 130 may receive fluid from a reservoir 170 containing fluid therein.

The pressure of the fluid contained in the master cylinder body 130 may be changed depending on the extent to which the fluid is pressurized by the master piston 110. The changed pressure may be transferred to a brake 600 through the master connection part 500 and the actuator connection part 400.

Cutoff holes 115A are formed in the master piston body 115, and a piston chamber (not shown) communicates with the cylinder space 131 and a supply flow path 117. Accordingly, when the master piston 110 is moved, before the cutoff holes 115A pass a first sealing cup part 116, the fluid of the cylinder space 131 is discharged to the supply flow path 117 through the piston chamber and the cutoff holes 115A. That is to say, in the cutoff holes 115A, the fluid of the piston chamber is flowed to the supply flow path 117 in a period L between the first sealing cup part 116 and the supply flow path 117. Therefore, in the period L before the cutoff holes 115A pass the first sealing cup part 116, a brake pressure is not generated substantially in the cylinder space 131 even though the master piston 110 is moved.

Also, when the master piston 110 is moved, after the cutoff holes 115A pass the first sealing cup part 116, the fluid of the cylinder space 131 is prevented from being flowed to the supply flow path 117 through the piston chamber and the cutoff holes 115A. Hence, after the cutoff holes 115A pass the first sealing cup part 116, a brake pressure is generated in the cylinder space 131 as the master piston 110 is moved.

The cutoff holes 115A are formed in a plural number along the circumferential direction of the master piston body 115 which forms the piston chamber therein. Thus, the fluid of the piston chamber may be discharged in the radial direction of the master piston body 115. A second sealing cup part 118 prevents the fluid of the cylinder space 131 from leaking outward.

In the present embodiment, the master cylinder 100 may further include the master elastic part 150. The master elastic part 150 may be inserted into the master cylinder body 130 such that one end (left end in FIG. 2) thereof is in contact with the master cylinder body 130 and the other end (right end in FIG. 2) thereof is in contact with the master piston 110. The master elastic part 150 may elastically support the master piston 110.

In the present embodiment, a coil spring may be exemplified as the master elastic part 150 to elastically support the master piston 110. However, other members such as a plate spring can be applied as long as they can elastically support the master piston 110.

The pedal force generation part 200 may be housed in the master cylinder body 130, and generate a pedal force by restricting a motion of the master piston 110 while interfering with the master piston 110 depending on the motion of the master piston 110. In the present embodiment, the pedal force generation part 200 may include a pedal force generation fixed part 210 and a pedal force generation body 230.

The pedal force generation fixed part 210 may be fixed to the master cylinder body 130. In the present embodiment, the pedal force generation fixed part 210 may be formed in a ring shape with a through-hole formed along the entrance direction of the master piston 110, fitted into a pedal force generation part fixing part 133 formed in a concave shape on the inner circumferential surface of the master cylinder body 130, and restricted from moving in the longitudinal direction of the master piston 110.

Figure 4:
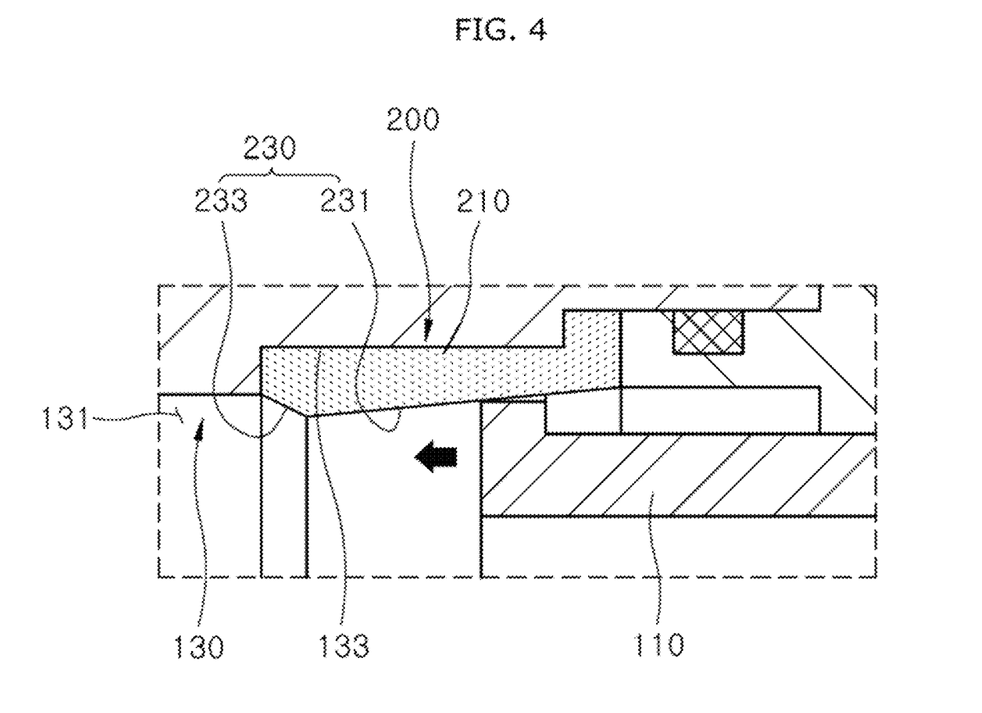
FIG. 4 illustrates a portion B of FIG. 3.
Figure 5:
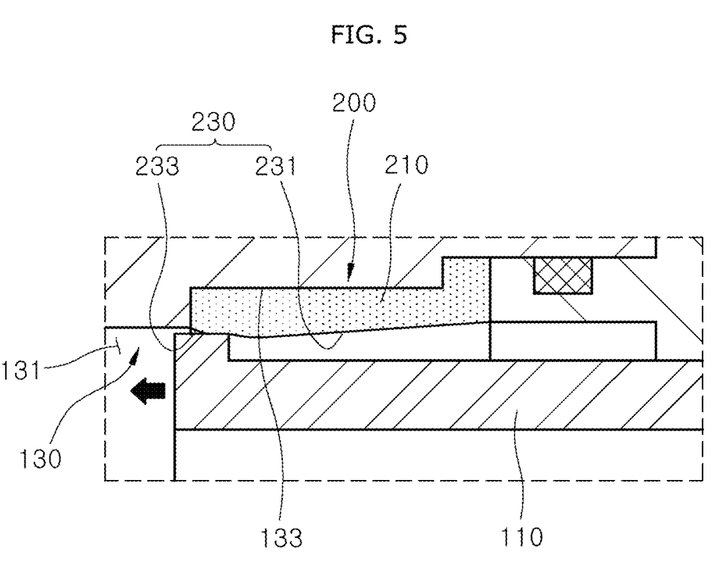
FIG. 5 illustrates that a master piston in accordance with the embodiment of the present invention has reached the boundary between first and second inclined parts.
Figure 6:
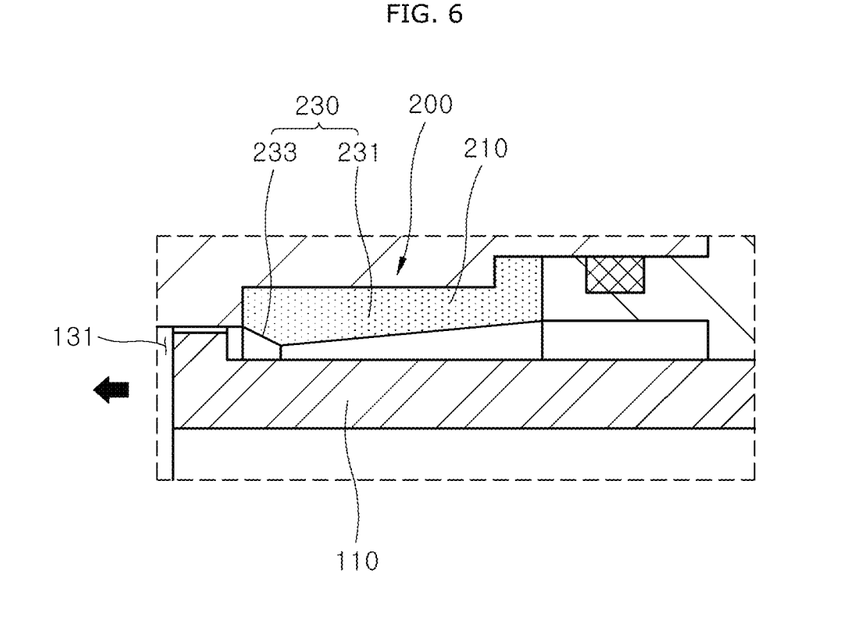
FIG. 6 illustrates that the master piston has passed through the pedal force generation part.

FIG. 4 illustrates a portion B of FIG. 3, FIG. 5 illustrates that a master piston in accordance with the embodiment of the present invention has reached the boundary between first and second inclined parts, and FIG. 6 illustrates that the master piston has passed through the pedal force generation part.

Referring to FIGS. 4 to 6, the pedal force generation body 230 may protrude from the inner circumferential surface of the pedal force generation fixed part 210 toward the central axis C of the master cylinder body 130, and form a pedal force by interfering with the master piston 110 through a motion of the master piston 110. In the present embodiment, the pedal force generation body 230 may include a first inclined part 231.

The first inclined part 231 may be inclined toward the central axis C of the master cylinder body 130 along the direction in which the master piston 110 enters the master cylinder body 130 (leftward in FIG. 2), and generate a pedal force by further increasing the force of interfering with the motion of the master piston 110, as the master piston 110 contacted with the first inclined part 231 is moved.

In the present embodiment, the pedal force generation part 200 may include a second inclined part 233. The second inclined part 233 may be connected to the first inclined part 231, and inclined in a direction away from the central axis C of the master cylinder body 130 along the direction in which the master piston 110 enters the master cylinder body 130 (leftward in FIG. 2).

Thus, the second inclined part 233 may release the pedal force applied to the master piston 110 when the master piston 110 passes through the first inclined part 231. Then, the hydraulic pressure of the master cylinder body 130 can be rapidly increased by the motion of the master piston 110 during an emergency.

The shapes and inclinations of the first and second inclined parts may be changed in order to adjust the pedal force or the like.

In the present embodiment, the pedal force generation part 200, specifically, the pedal force generation body 230 may be formed in a ring shape such that the master piston 110 enters and exits while coming in contact with the inner circumferential surface of the pedal force generation body 230.

In the present embodiment, the pedal force generation part 200, specifically, the pedal force generation body 230 may be made of rubber or the like. When the pedal force generation body 230 interferes with the master piston 110, a pedal force may be generated by a reaction force which is generated while the pedal force generation body 230 is deformed.

In the present embodiment, the pedal force generation part 200 and the pedal force generation body 230 can be injection-molded as one body, which makes it possible to improve durability while reducing the numbers of parts and processes.

The braking actuator 300 may increase the hydraulic pressure by pressurizing the fluid, and operate the brake 600 coupled to a wheel 30 through the actuator connection part 400 such that the brake 600 can generate a braking force to restrict rotation of the wheel 30.

In the present embodiment, the braking actuator 300 may include a hydraulic device such as an electro-hydraulic brake (EHB) or e-booster, and increase the hydraulic pressure such that the brake 600 can generate a braking force.

The actuator connection part 400 may fluidly connect the braking actuator 300 and the brake 600, such that the hydraulic pressure provided from the braking actuator 300 is transferred to the brake 600.

The actuator connection part 400 may include an actuator connection flow path 410 and an actuator valve 430. The actuator connection flow path 410 may fluidly connect the braking actuator 300 and the brake 600, and the actuator valve 430 may be mounted on the actuator connection flow path 410 to control a transfer of hydraulic pressure through the actuator connection flow path 410.

The actuator valve 430 may include a solenoid valve, and operate in a normal closed type. When no electrical signal is inputted, the actuator valve 430 may block a transfer of hydraulic pressure through the actuator connection part 400.

The master connection part 500 may connect the master cylinder 100 and the actuator connection part 400, and control a transfer of hydraulic pressure of the master cylinder 100 to the brake 600 through the actuator connection part 400.

In the present embodiment, the master connection part 500 may include a master connection flow path 510 and a master connection valve 530. The master connection flow path 510 may fluidly connect the master cylinder 100 and the actuator connection part 400, and the master connection valve 530 may be mounted on the master connection flow path 510 so as to control a transfer of hydraulic pressure through the master connection flow path 510.

The master connection valve 530 may include a solenoid valve, and operate in a normal open type. When no electrical signal is inputted, the master connection valve 530 may allow the transfer of hydraulic pressure through the master connection flow path 510.

Figure 7A:
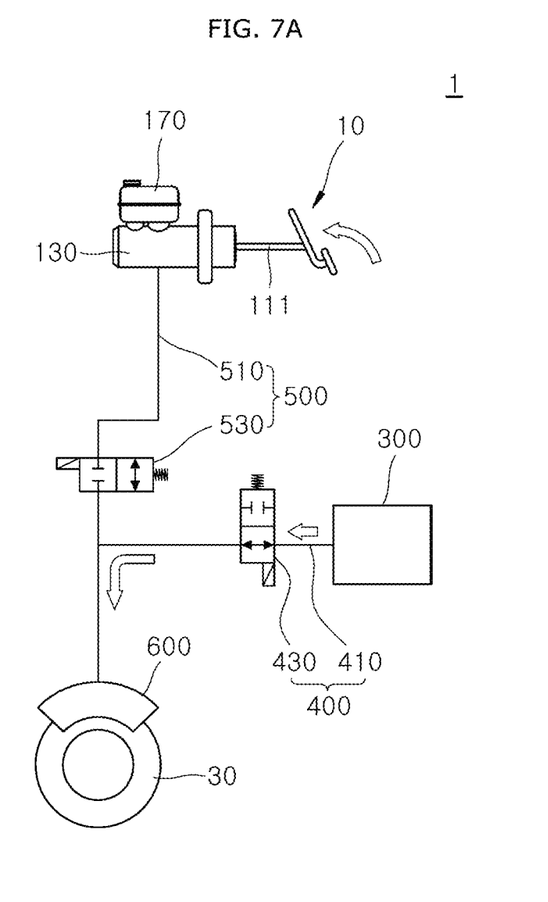
FIGS. 7A and 7B are conceptual views illustrating an operation of the brake device in accordance with the embodiment of the present invention.
Figure 7B:
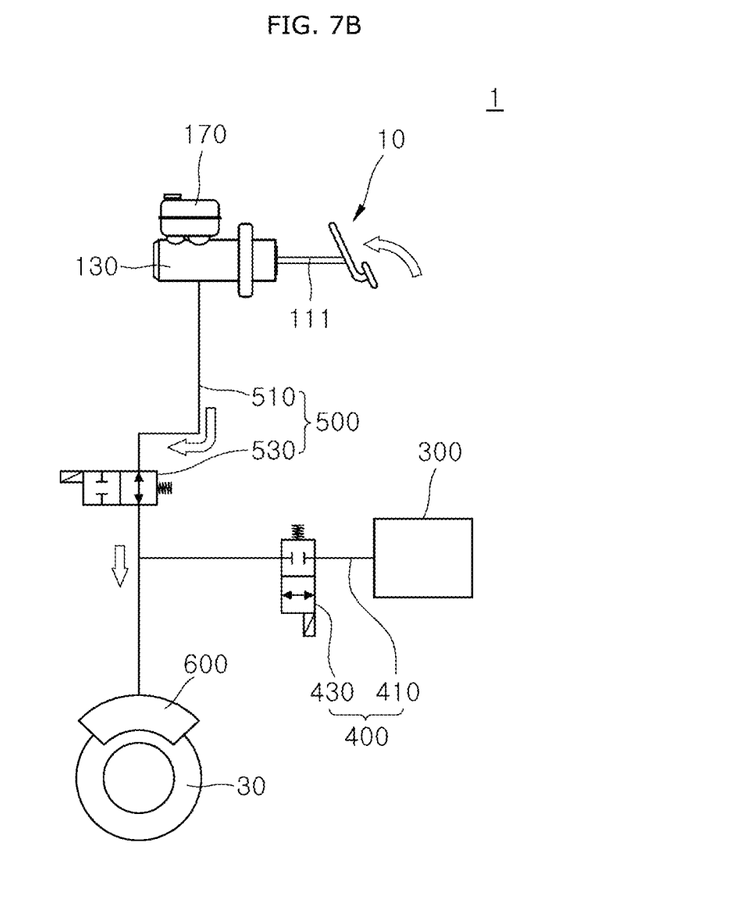

FIGS. 7A and 7B are conceptual views illustrating an operation of the brake device in accordance with the embodiment of the present invention. Hereafter, the operation principle and effect of the brake device 1 in accordance with the embodiment of the present invention will be described as follows.

When a driver steps on the pedal 10, a pedal sensor (not illustrated) may measure a moving distance of the pedal 10, and transfers an electrical signal to the braking actuator 300, the actuator valve 430 and the master connection valve 530.

In a normal mode, the master connection valve 530 receiving the electrical signal may block the master connection flow path 510, and the actuator valve 430 may open the master connection flow path 510 (refer to FIG. 7A).

When the driver presses the pedal 10, the master piston 110 may be moved in connection with the motion of the pedal 10 while pressing the master elastic part 150, and generate a pedal force by interfering with the pedal force generation part 200, specifically, the first inclined part 231 while coming in contact with the first inclined part 231.

However, since the master connection flow path 510 is blocked by the master connection valve 530, the internal hydraulic pressure of the master cylinder 100 may not be transferred to the brake 600.

When the electrical signal is inputted to the braking actuator 300, the braking actuator 300 may amplify the hydraulic pressure. The hydraulic pressure amplified by the braking actuator 300 may be transferred to the brake 600 through the master connection flow path 510 opened by the actuator valve 430, and operate the brake 600 to generate a braking force.

In a fail mode in which the braking actuator 300 or the like is not operated, the master connection flow path 510 in a normal open type may open the master connection flow path 510, and the actuator valve 430 in a normal closed type may block the master connection flow path 510 (refer to FIG. 7B).

In such a fail mode, the internal hydraulic pressure of the master cylinder 100, which the driver amplifies by pressing the pedal 10, may be transferred to the brake 600 through the master connection flow path 510 and the actuator connection flow path 410, thereby generating a braking force.

In the present embodiment, when the master piston 110 passes through the first inclined part 231, the brake device 1 may release the pedal force to restrict the motion of the master piston 110, such that the hydraulic pressure increased by the motion of the master piston 110 is transferred to the brake 600. Thus, a braking force response speed in case of an emergency can be increased.

Thus, since the master cylinder 100 and the pedal force generation part 200 serving as a pedal simulator are formed as one body, the volume and weight of the brake device 1 and the number of parts such as valves can be reduced.

In accordance with the embodiment of the present invention, the master cylinder and the pedal force generation part serving as a pedal simulator can be formed as one body, thereby reducing the volume and weight of the device and the number of parts used therein.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A brake device comprising:
    a master cylinder containing hydraulic fluid;
    a master piston connected to a brake pedal and movable in the master cylinder along an axis, wherein the master piston comprises a piston head and a rod that connects the piston head and the brake pedal, wherein the piston head is configured to move from a first position and a second position along the axis for generating a hydraulic power for braking;
    an annular ring arranged in the master cylinder and between the first position and the second position, the annular ring comprising a through-hole and an inner wall surrounding the through-hole, the annular ring being elastically deformable;
    wherein, in response to an input on the brake pedal, the piston head is configured to move from the first position to the second position across the annular ring,
    wherein the piston head is sized to contact the inner wall when passing through the annular ring such that the annular ring deforms elastically and provides a reaction force against movement of the piston head whereas the piston head does not contact the annular ring at the first and second positions.

2. The brake device of claim 1, wherein an outer perimeter of the annular ring is in contact with a body of the master cylinder.

3. The brake device of claim 1, further comprising:
    a pedal connection part connecting the master piston to the brake pedal.

4. The brake device of claim 1, wherein the inner wall of the annular ring comprises a first inclined surface and a second inclined surface that are inclined with respect to the axis and meet at a ridge protruding toward the axis, wherein the annular ring has an inner diameter at the ridge which is smaller than an outer diameter of the piston head,
    wherein when moving from the first position to the second position, the piston head is configured to contact the first inclined surface and subsequently contact the ridge.

5. The brake device of claim 1, wherein the annular ring is a single piece ring made of rubber.

* * * * *